Nov. 2, 1965 F. KIRSCHNER 3,215,225
LAMINATED ACOUSTIC PANELS WITH OUTER METAL LAYERS, FIBROUS
CORE AND VISCOELASTIC DAMPING LAYER
Filed Nov. 29, 1961 2 Sheets-Sheet 1

FIG.2. EFFECT OF DAMPING

INVENTOR
FRANCIS KIRSCHNER
BY

HIS ATTORNEYS

INVENTOR
FRANCIS KIRSCHNER
BY

HIS ATTORNEYS

United States Patent Office 3,215,225
Patented Nov. 2, 1965

3,215,225
LAMINATED ACOUSTIC PANELS WITH OUTER METAL LAYERS, FIBROUS CORE AND VISCO-ELASTIC DAMPING LAYER
Francis Kirschner, Valley Stream, N.Y., assignor to Korfund Dynamics Corporation, a corporation of New York
Filed Nov. 29, 1961, Ser. No. 155,589
5 Claims. (Cl. 181—33)

This invention relates generally to acoustic materials, and particularly to acoustic panels and other structural members for reducing the transmission and propagation of sound.

Acoustic panels which are composed of or have a core of sound absorbing material such as fiber glass or mineral wool are well known. Some such panels have metal panels on one or both surfaces thereof and are reinforced by means of interior bracing. The braces however detract from the acoustical properties of the panel for the reason that they form "sound bridges" which transmit vibrational energy through the panel.

A recognized disadvantage of metal sheathed acoustic panels is that the metal surfaces are responsive to vibrational excitation, and have a tendency to resonate and thus amplify the sound. Although certain materials such as asphalt and felts will provide some damping to prevent resonating, these materials have a low efficiency for the purpose.

In acoustical science, the resonant response of a panel is characterized by the factor "Q." "Q" is defined as the ration of the energy stored in the vibrating panel to the energy dissipated per cycle by the panel. Materials with a high "Q" are easily excited by vibrational energy and tend to produce undesirable resonance. In general metal panels which have sufficient structural strength and stiffness to become good building materials are also characterized by a high "Q."

The tendency of a panel to vibrate may be reduced by providing damping or dissipative resistance to vibration. If a panel has only a moderate amount of damping, the panel will vibrate in response to an initial elastic bending or displacement but the vibration will gradually decay. If sufficient damping is provided, the panel will not vibrate in response to an initial displacement but it will asymptotically return to its neutral position. "Critical damping" is the amount of resistance required to just prevent vibration. A critically damped panel has a Q of 1 and a panel having no damping has a Q of infinity.

Damping materials, such as asphalt and felt, because of their inefficiency impart less 1 percent of the critical damping when used in practical thicknesses. It is well known in the theory of vibration isolation that a typical asphalt damped panel assembly having less than 1% critical damping, may exhibit a response, Q, to vibration excitation between 300 and 600. The amplification due to the resonance of such a panel may be more than 50 times the original vibration due to the inefficiency of the asphalt type damping compounds.

The principal object of my invention is to provide a novel acoustical panel which is capable of attenuating sound and acoustical energy over a wide frequency spectrum and which is more efficient in the low frequency range than prior acoustic panels.

It is a further object of this invention to provide a self-supporting acoustical core which eliminates sound bridges in a panel structure and which has a high structural strength.

It is an important object of this invention to provide panels and other structural elements with a highly efficient viscoelastic damping material to reduce the "Q" of sheet metal elements.

Another object of this invention is to provide structural elements having decorative and sound absorbent surfaces formed of perforated metal without the danger of acoustic filler being lost through the openings of the surfaces.

Another object of this invention is to provide an acoustical panel assembly which may be easily handled and cut to a desired shape in the construction of buildings.

It is still a further object of this invention to provide acoustic panels which are suitable for noise isolation in air ventilation ducts.

Other objects of this invention will become apparent from the following description of typical embodiments of the invention.

In accordance with the invention, an acoustic panel is constructed as a sandwich of a number of layers. The outside layers are typically sheet metal. One or both of the sheet metal panels is coated on the interior side with a high-efficiency viscoelastic material comprising typically a plastic with a suitable filler. The viscoelastic material is used in such amount as to impart at least 10% of critical damping to the panel. By increasing the thickness of the coating higher percentages of the critical damping may be obtained. The viscoelastic material of the invention is generally applicable when panels such as sheet metal must be damped, and need not be limited to acoustical panel applications.

The interior of the acoustic panel is composed of a fire resistant acoustical core of building board such as gypsum board, fibrous wall board, asbestos board and the like. The core is self-supporting, and has sufficient structural integrity to eliminate the need for stiffening braces between the sheet metal faces of the panel.

In cases where it is desired to have low sound reflectance on one side of the acoustic panel, the viscoelastic coating is omitted from that side of the panel, and the sheet metal face on that side is perforated. The building board core material may also be used in panels when sound absorption or attenuation is desired, but where viscoelastic damping is not used or required.

For a better understanding of the invention, reference may be had to the accompanying drawings, in which:

FIGURE 2 is a graph illustrating the damping action of conventional acoustic panels and heavily damped panels according to the present invention;

Figure 1:
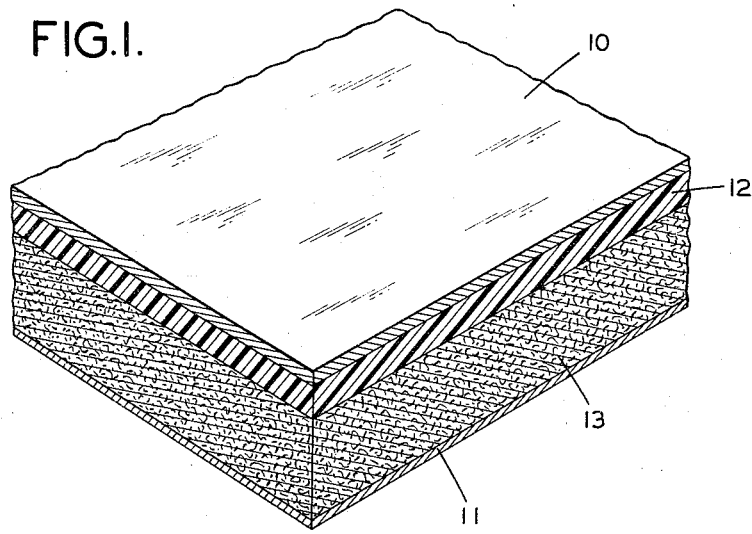
FIGURE 1 is a perspective view of a portion of an acoustic panel embodying the invention.

FIGURE 1 shows a typical panel embodying the invention constructed of four layers of material. The outside faces 10 and 11 of the panel are sheet metal, such as sheet steel, stainless steel, aluminum, brass, and the like, depending on the acoustical, thermal, or other requirements of the panel. The thickness of the sheet metal faces may be varied in accordance with the desired strength and weight of the panel. Typical thicknesses range from 11 to 22 gauge. Where one face is to be perforated, thinner materials are preferred.

As shown in FIGURE 1 the underside of facing sheet 10 is coated with a layer of high efficiency viscoelastic damping material 12. The damping layer 12 is essentially an amorphous polymer, such as polyvinyl chloride, polyvinyl alcohol, rubber, polyisobutylene, polypropylene, polyurethanes, polytetrafluorethylene and the like, preferably containing an inert filler such as vermiculite, expanded mica, talc, lead, granulated polystyrene aluminum oxide and the like. Suitable plasticizers for improving or maintaining the viscoelastic properties of the material may be included, also.

The viscoelastic layer 12 must be at least as thick as is required to provide 10% of the critical damping, and may vary between 1/32 inch to over 1/4 inch thick. The practical upper limit to the thickness of the layer 12 is controlled by the weight, thickness and size of the entire panel and may impart up to 100% of critical damping to the panel. The viscoelastic layer 12 may be applied to the metal sheet 10 by spraying, painting, spreading or the like, or may be cemented as a separate sheet to the metal sheet 10 by epoxy cement or the like.

Highly effective vibration damping materials for sheet metal structures can be obtained by making use of amorphous high polymers in the viscoelastic state. Materials of this kind can be adjusted to provide optimum damping at given frequencies and in broad temperature ranges. This can be done by mixing high polymers with different glass transition temperatures (the temperature at which the plastic becomes brittle) in suitable distribution or copolymerizing suitable monomers. Maximum damping can be obtained for a broad band of frequencies for a temperature range. This temperature range can be placed at the temperature at which the panel will be used. For instance this temperature range can cover temperatures from 0° to 120° F. with a maximum at 60° F. to cover normal indoor and outdoor weather conditions. Broader temperature bandwidths can be obtained, but maximum damping efficiency will be lower in this case. This follows from the laws which govern the molecular behavior of high polymers and thermo-plastics in general.

Damping materials have been incorporated for different combined systems such as metal sheets with a single damping layer on one side, or sandwich systems having metal sheets with a sound absorbing or other spacing layers, then the damping material, and a shearing layer above the damping material, according to demands with respect to frequency and temperature requirement. This spacer of sound absorbing material can be used as a thermal protection layer for the damping material for extremely high temperatures of jet engine or rocket engine exhaust panel application. One such thermal insulating and sound absorbing spacing layer is known under the trademark, "Tipersul," a fibrous potassium titanate. In this manner the damping efficiency of the damping material will not be affected by temperature changes on the exposed side of the sandwich structure. The stiffness of the spacer layer, "Tipersul," can be controlled by the addition of suitable binders to make it stiff in one direction, for instance, for longitudinal vibrations, and make it soft for flexural vibrations to lower the bending stiffness of the sandwich structure.

In structures having less than 1 percent of the critical damping, the "Q" for vibrational excitation may be 100 to 1000, whether the vibration is air borne sound or structural borne vibration. The amplification due to the resonance of the metal sheet 10 may be more than 100 times the original vibration due to the inefficiency of the damping compounds. With the high efficiency viscoelastic layer 12 the resonant response "Q" can be reduced to 5 or less by providing in a relatively thin layer 12 of damping material imparting 10% of critical damping to the panel, or more if the acoustic requirements make this necessary. A metal structure having only 5% of critical damping will have its amplification factor reduced to 10. Amplification factors of .8 or lower may be obtained as the percentage of critical damping is increased to 45% or higher.

The effectiveness of the viscoelastic layer 12 is shown in FIGURE 2. In a conventional or lightly damped structure as shown by the solid line of FIGURE 2 a thin metallic sheet will be highly responsive to vibrational energy at certain frequencies. The response of a heavily damped sheet metal panel to structural vibration is illustrated by the dotted line of FIGURE 2. This property may be advantageously used in controlling resonance of a single sheet metal panel as well as in making complete acoustic panels.

A further unique advantage of the viscoelastic layer 12 is that the filler may be used to control the thermal insulating abilities of the acoustical panel. By selecting various fillers for the damping material forming layer 12 the thermal conductivity, "K," can be varied from a value of 3.2 B.t.u./hr./sq. ft./deg. F./in. to .32 B.t.u./hr./sq. ft./deg. F./in.

The acoustical panel structure in FIGURE 1 is completed by interposing between layer 12 and lower metal sheet 11 the fire resistant acoustical core 13, which is self-supporting building board such as used in building construction, e.g., gypsum or wall board, asbestos board, and boards formed of mineral or vegetable fibers. The core 13 is cemented as by rubber cement or the like to layer 12 and to lower metal sheet 11, and the resulting sandwich united under pressure into the single finished panel shown in FIG. 1. This core 13 material has the advantage over conventional acoustical core materials in that it is self-supporting, and therefore interior bracing in the finished panel is not required. By eliminating the need for interior bracing to the panel, the so-called "sound bridges" are eliminated which have heretofore been a disadvantage in acoustic panels since they carry sound from one face to the other. A further advantage of this self-supporting mineral board is that the acoustic panel may be cut in the field to any size or shape. Due to its rigidity of the construction, the panel can support heavy loads. Walls can be subjected to repeated impacts without rupture, fatigue, or permanent deformation.

Figure 3:
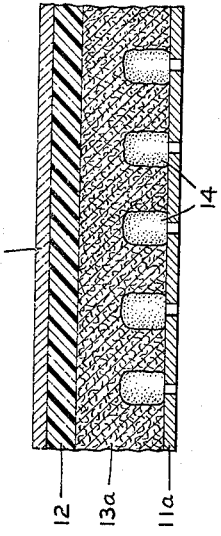
FIGURE 3 shows a sectional view of a typical panel.

The lower sheet metal facing 11 is shown in FIGURE 1 as a relatively thin metal sheet. This face may be perforated to provide a surface of low sound reflectancy. Referring to FIGURE 3, the sound absorption of the perforated face 11a may be improved by providing holes 14 in the mineral board core 13a that is exposed by the perforations in sheet 11a. Holes such as 14 may be conveniently formed by sandblasting (not illustrated). This will increase the effective area to obtain maximum sound absorption. The sound absorption of the panel can be further enhanced by tuning cavities 14 according to the theory of the Helmholtz resonator to give higher sound absorption in specific frequency ranges.

Figure 4:
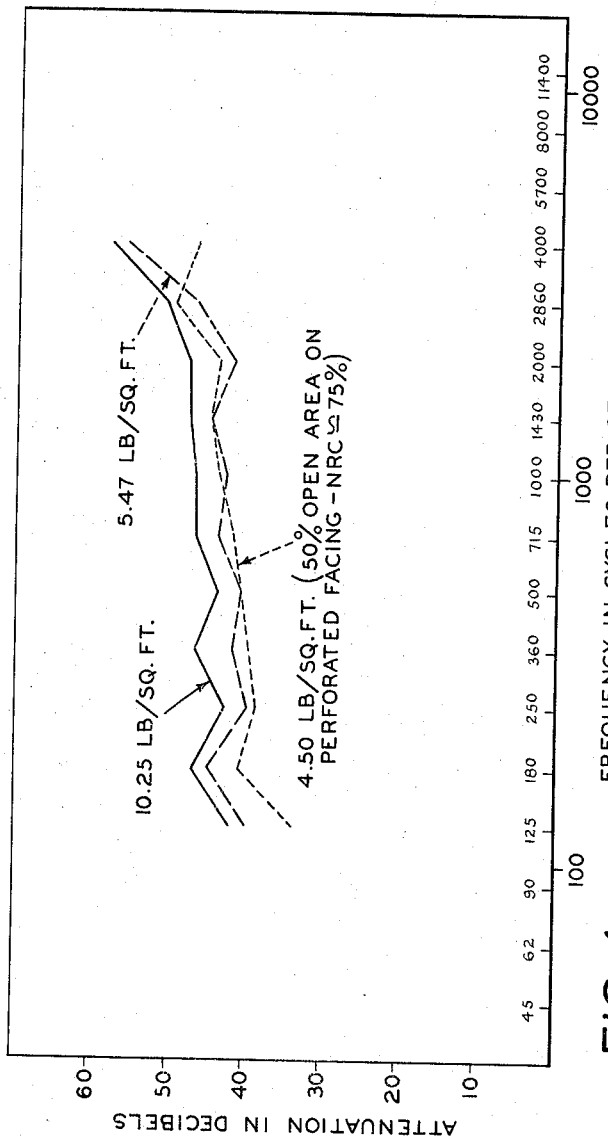
FIGURE 4 is a graph showing the sound attenuation of typical acoustic panels embodying the invention.

The sound-attenuating power of three typical panels such as illustrated in FIGURE 1 is shown in FIGURE 4.

The foregoing embodiment of my invention is given for illustrated purposes and is not intended to limit the scope of this invention except as defined by the appended claims.

I claim:

1. A panel of sandwich type construction suitable for use in the reduction of noise comprising a pair of spaced apart metal sheets, a layer of viscoelastic damping material underlying one of metal sheets having a thickness sufficient to impart at least 10% of critical damping of said metal sheet, a core of a self-supporting board interposed between said damping layer and the other of said metal sheets, and adhesive means uniting said metal sheets, layer and core into a finished panel, said damping layer being bonded to said one sheet over a substantial portion of the area thereof, whereby said layer and one sheet vibrate as a unitary body, and said second sheet being bonded to said core and perforated whereby said core is exposed for the absorption of sound energy.

2. A panel of sandwich type construction suitable for use in the reduction of noise comprising a pair of spaced metal sheets, a layer of viscoelastic damping material underlying the interior surface of one of said metal sheets having a thickness sufficient to impart at least 10% of critical damping to said metal sheet, a core of a self-supporting board interposed between said damping layer and the other of said metal sheets, and adhesive means uniting said metal sheets, layer and core into a finished panel, said damping layer being bonded to said one sheet over a substantial portion of the area thereof, whereby said layer and one sheet vibrate as a unitary body, and the second of said metal sheets being bonded to said core and perforated, and said core having holes therein, said holes in said core registering with said perforations in said second sheet.

3. A panel of sandwich type construction suitable for use in the reduction of noise comprising a pair of spaced metal sheets, a layer of viscoelastic damping material underlying the interior surface of at least one of said metal sheets, a core of a stiff, self-supporting building board composed of gypsum and having sufficient thickness to impart load-bearing strength to the panel, interposed between said damping layer and said other metal sheet, and adhesive means uniting said metal sheets, damping layer and core into a finished panel, said damping layer being bonded to the adjacent metal sheet over a substantial portion of the area thereof, whereby said damping layer and said one sheet vibrate together as a unitary body, and said damping layer having a thickness sufficient to afford at least 10% of critical damping to said panel.

4. A panel of sandwich type construction suitable for use in the reduction of noise comprising a pair of spaced metal sheets, a layer of viscoelastic damping material underlying the interior surface of at least one of said metal sheets, a core of a stiff, self-supporting building board composed of absetos board and having sufficient thickness to ipart load-bearing strength to said panel, interposed between said damping layer and said other metal sheet, and adhesive means uniting said metal sheets, damping layer and core into a finished panel, said damping layer being bonded to the adjacent metal sheet over a substantial portion of the area thereof, whereby said damping layer and one sheet vibrate together as a unitary body, and said damping layer having a thickness sufficient to impart at least 10% of critical damping to said panel.

5. A panel of sandwich type construction suitable for use in the reduction of noise comprising a pair of spaced metal sheets, a layer of a viscoelastic damping material underlying the interior surface of at least one of said metal sheets, a core of a stiff, self-supporting fibrous building board having sufficient thickness to impart load-bearing strength to the panel, interposed between said damping layer and said other sheets, and adhesive means uniting said metal sheets, damping layer and core into a finished panel, said damping layer being bonded to the adjacent metal sheet over a substantial portion of the area thereof, whereby said damping layer and said one sheet vibrate together as a unitary body, and said damping layer having a thickness sufficient to impart at least 10% of critical damping to said panel.

References Cited by the Examiner
UNITED STATES PATENTS

| | | | |
|---|---|---|---|
| 2,397,609 | 4/46 | Leadbetter | 181—33 |
| 2,791,289 | 5/57 | Proudfoot et al. | 181—33 |
| 2,922,483 | 1/60 | Harris | 181—33 |
| 2,999,041 | 9/61 | Lappala | 181—33 |
| 3,007,997 | 11/61 | Panariti | 181—33 |
| 3,038,551 | 6/62 | McCoy et al. | 181—33 |
| 3,051,260 | 8/62 | Eckel | 181—33 |
| 3,071,217 | 1/63 | Gould | 181—33 |
| 3,087,570 | 4/63 | Watters et al. | 181—33 |
| 3,087,571 | 4/63 | Kerwin | 181—33 |
| 3,087,573 | 4/63 | Ross | 181—33 |
| 3,110,369 | 11/63 | Ruzicka | 181—33 |
| 3,117,054 | 1/64 | Antonucci | 181—33 |

FOREIGN PATENTS

| | | |
|---|---|---|
| 555,616 | 3/57 | Belgium. |
| 604,197 | 8/60 | Canada. |
| 1,066,781 | 1/54 | France. |
| 513,580 | 10/39 | Great Britain. |
| 810,505 | 3/59 | Great Britain. |
| 564,424 | 6/57 | Italy. |

OTHER REFERENCES

Kurtze et al.: "New Wall Design for High Transmission Loss or High Damping," The Journal of The Acoustical Society of America, vol. 31, No. 6, June 1959, pages 739–748. Copy in Patent Office Scientific Library, Cl. 181—33 (.1)

LEO SMILOW, *Primary Examiner.*

C. W. ROBINSON, *Examiner.*

UNITED STATES PATENT OFFICE
CERTIFICATE OF CORRECTION

Patent No. 3,215,225　　　　　　　　　　　　November 2, 1965

Francis Kirschner

It is hereby certified that error appears in the above numbered patent requiring correction and that the said Letters Patent should read as corrected below.

Column 1, line 32, for "ration" read -- ratio --; line 51, after "less" insert -- than --; column 5, line 27, for "ipart" read -- impart --.

Signed and sealed this 9th day of August 1966.

(SEAL)
Attest:

ERNEST W. SWIDER　　　　　　　　　　　　EDWARD J. BRENNER
Attesting Officer　　　　　　　　　　　　　　Commissioner of Patents